United States Patent [19]
Maeda et al.

[11] 4,142,420
[45] Mar. 6, 1979

[54] METHOD FOR ELECTRICALLY CALIBRATING THE OUTPUT OF PRESSURE TRANSDUCERS

[75] Inventors: Shinichi Maeda, Kariya; Katsuhiko Oiwa, Handa, both of Japan

[73] Assignee: Nippondenso Co., Ltd., Kariya, Japan

[21] Appl. No.: 882,924

[22] Filed: Mar. 2, 1978

[30] Foreign Application Priority Data

May 2, 1977 [JP] Japan .................. 51-04077

[51] Int. Cl.² .............................. G01L 9/10
[52] U.S. Cl. ...................... 73/728; 323/51; 336/30
[58] Field of Search .............. 73/728, 722, 4 R; 336/30; 323/51

[56] References Cited
U.S. PATENT DOCUMENTS 3,848,180 11/1974 Jonke et al. .................. 323/51

Primary Examiner—Donald O. Woodiel
Attorney, Agent, or Firm—Cushman, Darby & Cushman

[57] ABSTRACT

In a pressure transducer of the type utilizing movement of a pressure responsive member to move the core of a differential transformer which is excited periodically by an oscillation circuit and produces a.c. voltages converted into a d.c. output voltage by an AC-DC conversion circuit, a calibration circuit which produces a variable calibrating voltage is provided. Calibrating the output voltage of the pressure transducer to a reference value at a reference pressure is attained by two sequential steps. In the first step, relative position between the core and the windings of the differential transformer is determined, with the reference pressure exerting on the pressure responsive member and with the calibration circuit being disconnected from the conversion circuit, so that the d.c. output voltage deviates from the reference value. In the second step, the calibration circuit is connected to the conversion circuit and the calibrating voltage is varied so that the d.c. output voltage is calibrated electrically to the reference value.

3 Claims, 3 Drawing Figures

METHOD FOR ELECTRICALLY CALIBRATING THE OUTPUT OF PRESSURE TRANSDUCERS

BACKGROUND OF THE INVENTION

The present invention relates to a method for calibrating the output of a pressure transducer utilizing a differential transformer and particularly to a method in which d.c. voltage of a pressure transducer is forcibly deviated from a reference value corresponding to a reference pressure and thereafter a calibrating voltage is added to the deviated d.c. voltage so that the output voltage of the pressure transducer is calibrated to the reference value electrically.

Pressure transducers utilizing a differential transformer have been known well in the field of electrical pressure detection. Such a pressure transducer comprises, in general, a housing forming a pressure chamber, a pressure responsive member movably supported in the presence chamber and a differential transformer associated with the pressure responsive member. The transformer has a primary and secondary windings and a movable core which are arranged in such a manner that the movable core is moved by the pressure responsive member in response to the pressure exerting thereon and the secondary windings produce, with the primary winding being excited periodically, a.c. voltages corresponding to the position of the movable core. An oscillation circuit is connected to the primary winding for exciting purpose and an AC-DC conversion circuit is connected to the secondary windings for AC-DC voltage converting purpose. According to this conventional arrangement, the pressure transducer detects the pressure and produces d.c. output voltage indicative of the detected pressure. It is a matter of course that each pressure transducer must be zero-calibrated to produce correct d.c. output voltage. Zero-calibration for the pressure transducer has been attained, as disclosed in the United States Pat. No. 3,848,180, by mechanically adjusting the position of the pressure responsive member fixed to the movable core. Although this conventional calibrating method is simple, it is difficult to attain fine zero-calibration on the pressure transducer designed to be small in size.

SUMMARY OF THE INVENTION

It is an object of the present invention to improve the calibrating method for pressure transducers of the type utilizing a differential transformer.

The calibrating method according to the present invention is improved in that the output of a pressure transducer is calibrated electrically. Prior to the electrical calibration, relative position between the movable core and the windings of a differential transformer associated with a pressure responsive member is determined, with the reference pressure exerting on the pressure responsive member, such that output value of the pressure transducer deviates from a desired reference value corresponding to the reference pressure. In the electrical calibration, a calibration circuit which produces a calibrating voltage is connected to the pressure transducer and the calibrating voltage is varied such that the deviated output value is calibrated or compensated to the reference value.

DESCRIPTION OF THE PREFERRED EMBODIMENT

Figure 1:
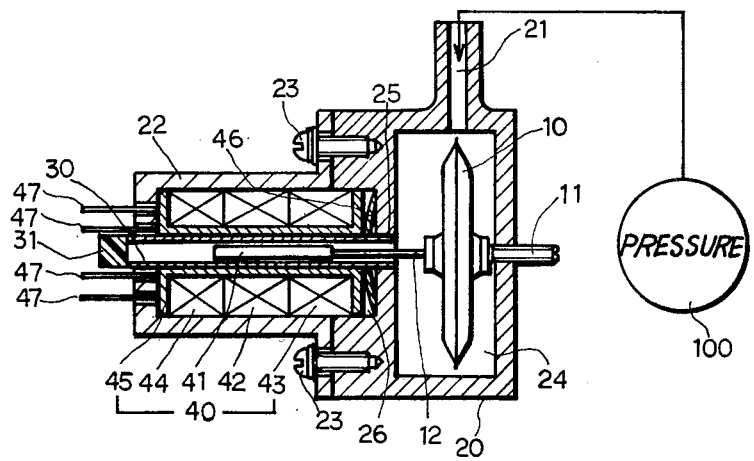
FIG. 1 is a sectional view illustrating mechanical connection of the pressure transducer used in the embodiment of the invention.

Referring first to FIG. 1, there is illustrated in cross section the mechanical unit of the pressure transducer. This mechanical connection, as has been conventional, mainly comprises an evacuated bellows 10 and a differential transformer 40 which are supported by respective aluminium housings 20 and 22. The evacuated bellows 10 is positioned in a pressure chamber 24 formed by the housing 20 into which a pressure to be detected is introduced through a port 21. One side of the evacuated bellows 10 is fixed to a threaded screw 11 provided through the housing 20 so that the evacuated bellows 10 expands and contracts axially in response to the pressure exerting thereon. The other side of the evacuated bellows 10 is fixed axially to a rod 12 which extends through a hole 25 provided on the housing 20. A guide pipe 30 is tightly received in the hole 25 to axially surround the rod 12 and communicate with the pressure chamber 24 through one open end thereof. The other open end of the guide pipe 30 is sealed by a seal member 31. The differential transformer 40 comprises, as has been known well, a movable iron core 41, a primary winding 42, secondary windings 43 and 44 and a bobbin 45. The movable core 41 is fixed to the rod 12 to move axially therewith in the guide pipe 30. The primary and secondary windings 42, 43 and 44 are wound axially on the bobbin 45 such that the primary winding 42 aligns between the secondary windings 43 and 44. The bobbin 45, supporting the windings 42, 43 and 44, is supported axially by the guide pipe 30. The housing 20 receives the differential transformer 40 in a recess 26 provided thereon and the housing 22 is fixed to the housing 20 by threaded screws 23 to encase the transformer 40 therein. A leaf spring 46 is provided in the recess 26 of the housing 20 to bias the bobbin 45 of the transformer 40 toward the housing 22 axially. Electrical leads 47 of the windings 42, 43 and 44 extend outside of the housing 22 so that the differential transformer 40 is electrically operated.

Figure 2:
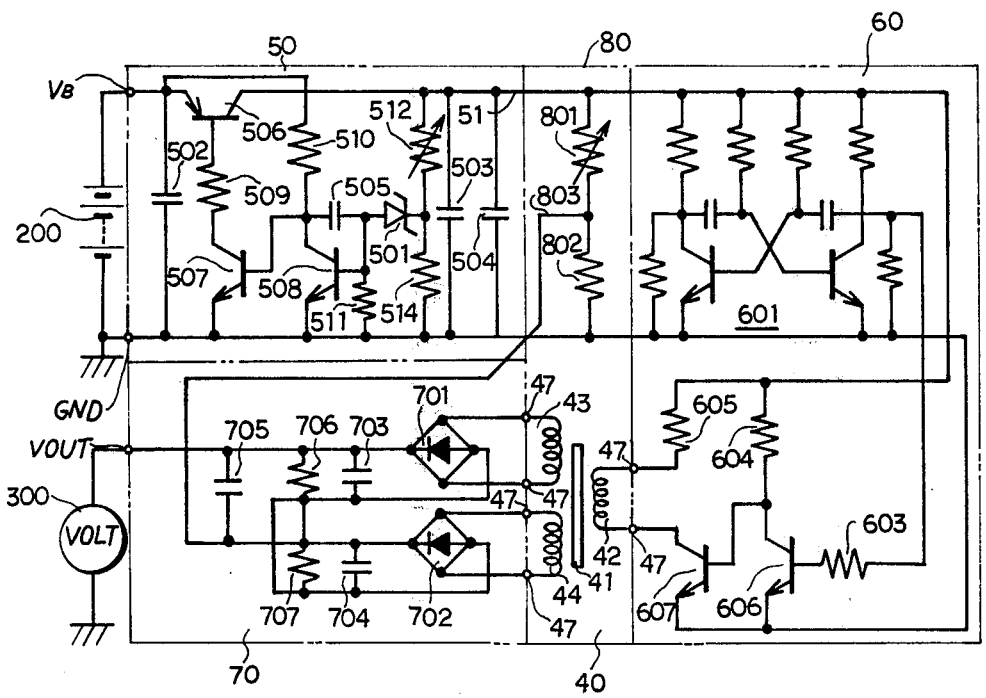
FIG. 2 is an electric wiring diagram illustrating electrical connection of the pressure transducer used in the embodiment of the invention.

Referring next to FIG. 2, there is illustrated an electric unit which is electrically connected to the differential transformer. The electric unit comprises a voltage regulation circuit 50 for regulating a voltage across the terminals $V_B$ and GND to a constant voltage, an oscillation circuit 60 for exciting the primary winding 42 of the transformer 40 periodically, an AC-DC conversion circuit 70 for converting a.c. output voltages of the secondary windings 43 and 44 of the transformer 40 into a d.c. output voltage, and a calibration circuit 80 for calibrating the d.c. output voltage of the conversion circuit 70. The terminals $V_B$ and GND are connected to a positive and negative terminals of a d.c. electric power source 200 respectively, and the terminal GND is grounded. A terminal Vout is connected to a utilization device.

The voltage regulation circuit 50 which is conventional in construction comprises a constant voltage diode 501, smoothing capacitors 502, 503 and 504, an oscillation preventive capacitor 505, transistors 506, 507 and 508, and resistors 509, 510, 511, 512 and 513. The voltage regulation circuit 50 regulates an input voltage applied across the terminals $V_B$ and GND to a desired constant voltage $V_c$. The magnitude of the constant voltage $V_c$ supplied across positive and negative buses 51 and 52 is determined by the resistance of the resistor 512 which is variable resistance type. The oscillation circuit 60 which is conventional in construction comprises a well-known astable multivibrator 601, resistors 603, 604 and 605, and transistors 606 and 607. The astable multivibrator 601 supplied with the constant voltage $V_c$ oscillates to produce pulse signals of a fixed frequency. The periodic pulse signals are applied to the transistor 606 through the resistor 603 so that the transistor 606 renders the transistor 607 ON and OFF alternately in response to the periodic pulses. Since the emitter-collector path of the transistor 607 is connected in series with the primary winding 42 of the transformer 40 and the resistor 605 between the positive and negative buses, the primary winding 42 is excited during the ON condition of the transistor 607.

The differential transformer 40, with the primary winding 42 being excited periodically, produces a.c. output voltages across the secondary windings 43 and 44, respectively. The frequencies of the a.c. output voltages are equal to the frequency of the periodic pulse signals of the oscillation circuit 60, while the amplitudes of the a.c. output voltages are varied in accordance with the position of the movable core 41. The amplitudes of the a.c. output voltages of the respective secondary windings 43 and 44 increase and decrease, in the illustrated embodiment, as the movable core 41 is moved to the right in FIG. 1, or upward in FIG. 2. The amplitudes of the a.c. output voltages become equal to each other only when the movable core 41 is held intermediate between the secondary windings 43 and 44.

The AC-DC conversion circuit 70 comprises full-wave rectifiers 701 and 702, capacitors 703, 704 and 705, and resistors 706 and 707. The rectifiers 701 and 702 are connected to the respective secondary windings 43 and 44 to full-wave rectify the a.c. output voltages of the transformer 40. The capacitor 703 and the resistor 706 constituting a smoothing circuit are connected in parallel with the rectifier 701 to smooth rectified output voltage, while the capacitor 704 and the resistor 707 constituting another smoothing circuit are connected in parallel with the rectifier 702 to smooth rectified output voltage. The capacitor 705 is connected across the two smoothing circuits to produce, across the terminal GND and Vout connected to one side of the capacitor 705, the d.c. output voltage which is equal to the difference between two smoothed output voltages. The other side of the capacitor 705 is connected to an electrical lead 803.

The calibration circuit 80 comprises resistors 801 and 802 connected in series betwen the positive and negative buses 51 and 52. The resistors 801 and 802 provides at the junction therebetween a calibrating voltage which is varied in dependence on the resistance of the resistor 801 of the variable resistance type.

According to the mechanical and electrical connections of the pressure transducer described hereinabove, method to electrically calibrate the output of the pressure transducer is explained with the provision that the output of the pressure transducer is desired to be calibrated to a reference voltage (0 volt) in response to a reference pressure (200 mmHg).

Prior to the electric calibration, the mechanical unit is assembled as shown in FIG. 1 and the electrical leads 47 extending from the mechanical unit are connected to the electrical unit as shown in FIG. 2. In the electrical unit, the electrical lead 803 connected to the capacitor 705 of the AC-DC conversion circuit 70 is disconnected from the junction between the resistors 801 and 802 of the calibration circuit 80 and grounded. The mechanical unit is then coupled to a reference pressure source 100 as shown in FIG. 1 so that the constant reference pressure is introduced into the presence chamber 24. The evacuated bellows 10 moves the movable core 41 of the transformer 40 to a corresponding position in response to the reference pressure and the AC-DC conversion circuit 70 responsively produces the d.c. output voltage across the terminals Vout and GND. The magnitude of the d.c. output voltage, on this occasion, is dependent only on the position of the movable core 41 relative to the windings 42, 43 and 44, since the electrical lead 803 is grounded. The d.c. output voltage of the AC-DC conversion circuit 70 can be recognized by a voltmeter 300 connected to the terminal Vout. When the d.c. output voltage is lower than the reference voltage, the screw 11 is fixed to the housing 20 by an adhesive (not shown). When, on the contrary, the d.c. output voltage is equal to or higher than the reference voltage, the screw 11 is rotated manually to change the position of the movable core 41 until the d.c. output voltage becomes lower than the reference voltage. When the d.c. output voltage is forcibly deviated from the reference voltage, rotating the screw 11 is stopped and the screw 11 is fixed to the housing 20 by adhesive. It should be noticed in this step that, since the d.c. output voltage of the AC-DC conversion circuit 70 is required not to become equal to but to deviate negatively from the reference voltage, adjusting the position of the movable core 41 relative to the windings 42, 43 and 44 can be attained roughly. The deviation of the d.c. output voltage from the reference voltage should be necessarily smaller than the constant voltage Vc supplied across the buses 51 and 52.

The pressure transducer, the d.c. output voltage having been deviated negatively from the reference value, is subjected to the electrical calibration. In this step the port 21 is still kept coupled to the reference pressure source, while the lead 803 connected to the capacitor 705 of the AC-DC conversion circuit 70 is connected to the junction between the resistors 801 and 802 of the calibration circuit 80. With the reference pressure being applied to exert on the evacuated bellows 10 and the positive calibrating voltage being added to the deviated d.c. output voltage of the AC-DC conversion circuit 70, the resistance of the resistor 801 is varied manually so that the positive calibrating voltage is varied. When the d.c. output voltage produced across the terminals Vout and GND becomes equal to the reference value owing to the calibrating voltage equal to the absolute deviation of the deviated d.c. output voltage, varying the resistance of the resistor 801 is stopped and the resistor 801 is fixed by the adhesive (not shown) to fix the resistance thereof. The pressure source 100, the power source 200 and the voltmeter 300 must be disconnected, when zerocalibration is completed. It should be noticed in this electrical calibration that, since the change in the calibrating voltage can be made small relative to a large amount of adjustment on the resistor 801, adjusting the d.c. output voltage of the AC-DC conversion circuit 70 can be attained precisely with ease. The electrical calibration is very advantageous for the pressure transducer designed to be small in size.

Figure 3:
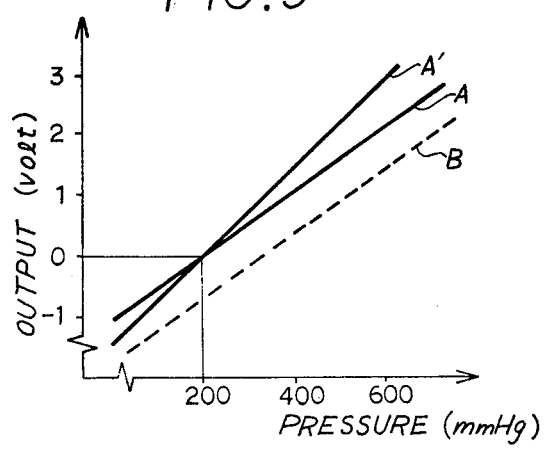
FIG. 3 is a graph illustrating the relationship between the pressure and the output of the pressure transducer illustrated in FIGS. 1 and 2.

Provided that the pressure transducer, having been zero-calibrated as described hereinabove, is coupled to a variable pressure source such as the intake manifold of an internal combustion engine, the d.c. output voltage of the pressure transducer varies in proportion to the pressure applied thereto. The transducer output relative to the pressure is shown by a solid characteristic line A in FIG. 3. The phantom characteristic line B in FIG. 3 shows the transducer output relative to the pressure with the assumption that the abovedescribed electrical calibration has not been attained on the pressure transducer. The sensitivity of the transducer output relative to the pressure can be adjusted, as shown by the other solid characteristic line A' in FIG. 3, by varying the resistance of the resistor 512 in the voltage regulation circuit 50. It should be noticed that adjusting the sensitivity of the pressure transducer, having been zero-calibrated, does not cause any changes in the reference output value of the pressure transducer relative to the reference pressure.

The abovedescribed embodiment can be modified as follows.

The evacuated bellows 10 may be fixed directly to the housing 20 without the threaded screw 11. Provided that the screw 11 is eliminated, the length of the rod 12 connecting the movable core 41 and the evacuated bellows 10 must be designed long or short enough so that the pressure transducer, having not been zero-calibrated, necessarily produce the d.c. output voltage deviated negatively from the reference voltage in response to the reference pressure.

The resistor 801 connected to the electrical lead 803 may be disconnected from the positive bus 51 so that the electrical lead 803 is grounded through the resistor 802.

The resistor 801 may not be necessarily the variable resistance type. Provided that the variable resistor is not used in the calibration circuit 80, resistors having respective constant resistances must be connected one by one in the calibration circuit 80 so that the calibrating voltage is varied to become equal to the deviated d.c. output voltage in the absolute value.

The electrical unit may be designed to provide a negative calibrating voltage from the calibration circuit 80. Provided that the calibrating voltage is negative, the mechanical unit must be designed or adjusted prior to the electrical calibration so that the d.c. output voltage of the pressure transducer deviates positively from the reference voltage in response to the reference pressure.

The present invention described with reference to the illustrated and modified embodiments can be applied to other pressure transducers in which other pressure responsive members such as a pressure responsive diaphragm are utilized.

What we claim is:

1. In combination with a pressure transducer in which assembled are a housing forming a chamber therein, a pressure responsive member supported in said chamber to move in response to the pressure exerting thereon, a differential transformer associated with said pressure responsive member such that the relative position between a core and a primary and secondary windings of the former is varied in response to the movement of the latter, an oscillation circuit connected to said primary winding to excite said primary windings periodically, and a conversion circuit connected to said secondary windings to convert a.c. voltages produced by said secondary windings into a d.c. output voltage, a method for calibrating the output of said pressure transducer comprising the steps of:

providing a pressure source and a calibration circuit which respectively produce a constant reference pressure and a d.c. calibrating voltage;

varying the relative position between said core and said windings of said transformer, with said chamber being communicated with said pressure source and with said conversion circuit being disconnected from said calibration circuit, such that said d.c. output voltage of said conversion circuit deviates from the reference zero voltage in a polarity opposite to that of said d.c. calibrating voltage in response to said constant reference pressure;

varying said d.c. calibrating voltage, with said chamber being communicated with said pressure source and with said conversion circuit being connected to said calibration circuit, such that said d.c. output voltage deviated in said position varying step is varied by said d.c. calibrating voltage; and fixing said d.c. calibrating voltage to a value by which said d.c. output voltage is calibrated to said reference zero voltage.

2. In combination with a pressure transducer in which assembled are a housing forming a chamber therein, a pressure responsive member supported in said chamber to move in response to the pressure exerting thereon, a differential transformer in which the position of a core relative to a primary and two secondary windings is varied in response to the movement of said pressure responsive member, a voltage regulation circuit for supplying a constant regulated voltage in one of positive and negative polarities, an oscillation circuit connected between said voltage regulation circuit and said primary winding to excite said primary winding periodically, and a conversion circuit connected to said secondary windings to convert a.c. signals produced by said secondary windings into a d.c. output signal, a method for calibrating the output of said pressure transducer comprising the steps of:

supplying said chamber with a constant reference pressure in response to which the magnitude of said d.c. output signal is desired to become zero;

fixing the position of said core relative to said primary and secondary windings, with said constant reference pressure exerting on said pressure responsive member, such that the magnitude of said d.c. output signal deviates from zero in the other of said positive and negative polarities in response to said constant reference pressure;

adding a d.c. calibrating signal to said deviated d.c. output signal, said d.c. calibrating signal being produced by a plurality of resistors connected to divide said constant regulated voltage;

varying the resistance of one of said resistors such that the magnitude of said d.c. calibrating signal is responsively varied; and fixing the resistance of said one of said resistors when said d.c. calibrating signal becomes equal to said deviated d.c. output signal in respective absolute magnitudes.

3. A method to calibrate the output of a pressure transducer to zero with respect to a reference pressure comprising the steps of:

assembling a housing having a chamber therein, a pressure responsive member, a differential transformer in which a primary winding and secondary windings are wound axially to allow a core to move therethrough, electric excitation means for exciting said primary winding with a d.c. supply voltage in one of positive and negative polarities and electric conversion means for converting a.c. voltages of said secondary windings into a d.c. output voltage such that said core is fixed to said pressure responsive member to be moved relative to said primary and secondary windings in response to pressures exerting on said pressure responsive member, the distance between said core and said pressure responsive member being determined such that said d.c. output voltage deviates from zero voltage in the other of said positive and negative polarities when a constant reference pressure exerts on said pressure responsive member;

supplying said chamber with said constant reference pressure which exerts on said pressure responsive member;

adding a d.c. calibrating voltage to d.c. output voltage deviated in response to said constant reference pressure, said d.c. calibrating voltage being produced by a plurality of resistors connected to divide said supply voltage;

varying the resistance of one of said resistors such that said d.c. calibrating output voltage is responsively varied; and fixing the resistance of said one of said resistors when said deviated d.c. output voltage is calibrated to said zero voltage by said d.c. calibrating voltage.

* * * * *